Dec. 15, 1964 F. G. WEIS ETAL 3,161,590
ACTIVATED SLUDGE TYPE SEWAGE TREATING APPARATUS
Filed May 9, 1960

INVENTORS.
Frank G. Weis
Millis R. Golly
BY
ATTORNEYS.

United States Patent Office 3,161,590
Patented Dec. 15, 1964

3,161,590
ACTIVATED SLUDGE TYPE SEWAGE TREATING APPARATUS
Frank G. Weis, Kansas City, Mo., and Millis R. Goily, Leawood, Kans., assignors to Union Tank Car Company, Chicago, Ill., a corporation of New Jersey
Filed May 9, 1960, Ser. No. 27,787
2 Claims. (Cl. 210—221)

The present invention relates to sewage treatment and more particularly to improve sewage treatment plant construction.

The present invention has for its most important object the provision of an improved sewage treatment plant having structure therein in the aeration chamber which returns sewage taken out near the bottom of the chamber to the chamber near the top thereof so that better mixing results.

It is a further object of the present invention to provide means for guiding the flow of the fluids taken out of the aeration chamber upwardly through a passageway provided therefor and returning the same to the aeration chamber at the level of material contained therein.

It is a further object of the present invention to provide a passageway for guiding a portion of the sewage in the chamber upwardly against the normal flow and returning the same to the aeration chamber at the level of sewage therein, wherein means are provided in the passageway to encourage the upward flow of materials.

It is a still further object of the present invention to provide the passage between walls of a partition separating the tank into aeration and settling chambers.

Further objects and advantages consistent with and inherent in the structure of the present invention will become obvious as a description of the present invention proceeds.

Figure 1:
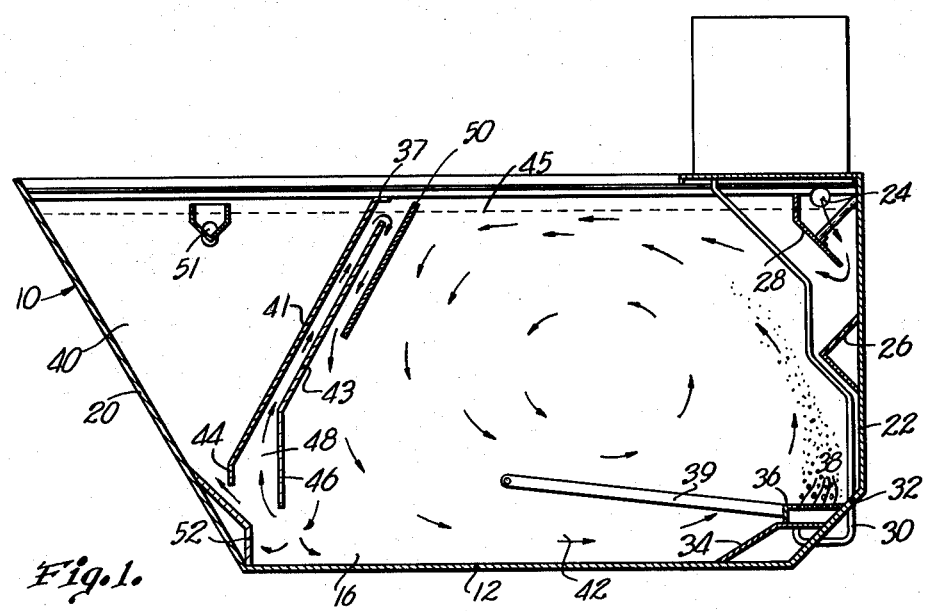
FIGURE 1 is a sectional side elevational view of a tank provided with structure embodying the present invention.

There is shown in the drawings and particularly in FIG. 1, wherein the preferred embodiment is illustrated, an improved sewage treatment tank or plant indicated generally by the number 10 which in longitudinal cross section is generally trapezoidal in shape.

Tank 10 has a bottom 12 and a pair of generally parallel side walls 16 and 18 integral therewith. A pair of end walls 20 and 22 are provided which are not parallel and therefore contribute to the trapezoidal cross-sectional shape of tank 10.

Tank 10 is provided with a sewage inlet 24 near the juncture of the upper margins of side wall 16 and end wall 22. A baffle 26 is provided on end wall 22 spaced below sewage inlet 24 which diverts upward flow along end wall 22 which will subsequently be described. Baffle 26 insures that the sewage coming in through inlet 24 is not prevented from flowing out from behind a guide flange 28 which is provided connected to side 16 and against which the incoming sewage from inlet 24 flows to guide the fluid into tank 10 in the proper flow pattern.

Figure 2:
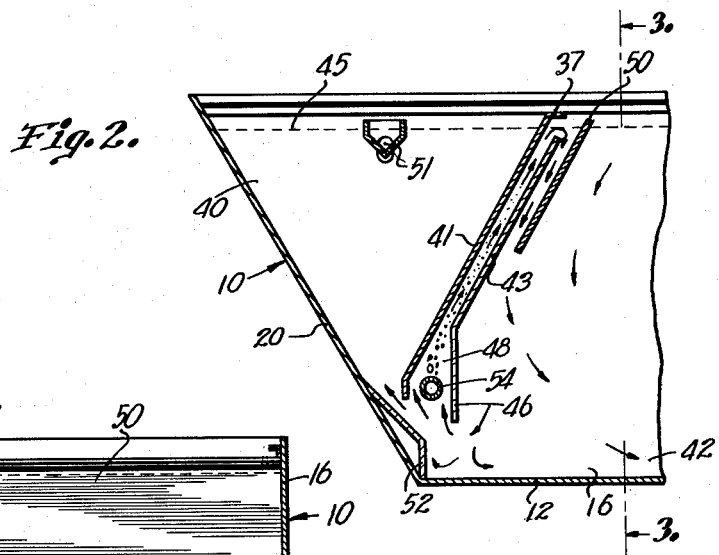
FIG. 2 is a sectional side elevational view of a portion of FIG. 1 showing another embodiment of the present invention.

In order to insure the desired flow pattern within the tank as indicated by the arrows in FIGS. 1 and 2 an air inlet conduit 30 is provided which enters the tank through a bias portion 32 of side 22 adjacent tank bottom 12. This places the air inlet conduit in spaced relation below baffle 26 for reasons which will become apparent as this description proceeds.

A support 34 interconnects bottom 12 and bias portion 32 of the tank near the point of entry of air inlet conduit 30 and has disposed thereon an air diffuser 36 having a plurality of orifices 38 therein. Air inlet conduit 30 terminates in an aperture in support 34 below the diffuser 36 so that the air brought in is dispersed through the various orifices 38 in diffuser 36. The bubbles formed by the release of the air through the orifices 38 travel upwardly in order to escape to the atmosphere, encouraging the flow pattern as shown in FIG. 1. A link 39 is shown pivoted to side 16 of tank 10 and connected at the other end to the air diffuser. A wire or other connection (not shown) may be made between the exterior of the tank and diffuser 36 such that diffuser 36 may be raised about the pivot point of link 39 from the tank to be cleaned as necessary. For a further understanding of the link 39 and diffuser 36 arrangement, reference is made to the co-pending application of Weis, Serial No. 740,279, filed June 6, 1958, now Patent No. 2,989,186, issued June 20, 1961. As such, the details of the link and diffuser arrangements form no specific part of the present invention, of course.

In the embodiments shown particularly in FIGS. 1 and 2 a partition 41 is provided for separating the tank into a settling chamber 40 and an aeration chamber 42. The partition is fixed to and extends between side walls 16 and 18 and extends downwardly from the upper margins of the sides terminating in spaced relation from bottom 12 and side wall 20. The upper extremity of partition 41 is provided with a flange 37 which is generally parallel to the top margins of sides 16 and 18. The embodiment of FIGS. 1 and 2 is further provided with a second partition or wall 43 which has a portion extending from a point on the side walls 16 and 18 below a level 45 of sewage maintained in the tank parallel to partition 41 and terminating in spaced relation from bottom 12 of tank 10. The termination of walls 41 and 43 in spaced relation to bottom 12 provides a zone of communication between chambers 40 and 42. Each wall or partition 41 and 43 has at its lower extremity a flange, the flange on wall 41 being numbered 44 and the flange on wall 43 being numbered 46. The flanges 44 and 46 are substantially vertical with respect to bottom 12 of tank 10 and are spaced apart a greater distance than the parallel portions of walls 41 and 43 to form a mouth 48 between the flanges 44 and 46, respectively. The reason for mouth 48 will be further clarified as this description proceeds. Wall or partition 43 is fixed to side walls 16 and 18 in the same manner as is partition 41.

In the embodiments of FIGS. 1 and 2 there is further shown a third wall or partition 50 fixed to side walls 16 and 18. Third wall or partition 50 is generally parallel to wall 43 and extends downwardly from a point above level 45 terminating in greater spaced relation from bottom 12 of tank 10 than either of walls 41 or 43.

There is further shown in the settling tank 40 a sewage outlet conduit 51 for draining off the fluid after the treatment has been finished and maintaining the level 45 in the tank at a predetermined height above bottom 12.

In operation the structure of FIGS. 1 and 2 operates in the following manner, assuming the tank to be filled to the level indicated by the number 45. Sewage is brought into the tank through inlet conduit 24 flowing against the guide flange 28 and thence downwardly toward the baffle 26. At the same time air is being brought in through conduit 30 and released through the orifices 38 of diffuser 36 and released in bubbles rising along wall 22 of tank 10 and encouraging and speeding the stream in an upward direction from bottom 12 towards the level 45. The baffle 26 diverts the rising flow of bubbles and sewage from flange 28 enabling incoming sewage to flow out from behind the flange 28. As the fluid flows across level 45 in the pattern indicated by the arrows it flows against wall 50 and is directed downwardly thereby toward bottom 12 of tank 10. As the stream reaches the bottom 12 of tank 10 a first portion of the flow is passed through the zone of communication under flanges 44 and 46 into settling chamber 40. A second portion of the flow through the zone of communication is passed into mouth 48 and is directed upwardly through the passage defined by the two walls toward level 45. As the fluid reaches level 45 wall 43 terminates and the fluid flows over the top thereof and against third wall 50 and is directed downwardly in the passage defined by walls 50 and 43 into the aeration chamber. The reduction in pressure caused by the velocity of the fluid in tank 10 along the aeration chamber face of wall 50 causes the fluid to move downward between walls 50 and 43. This, in turn, causes the fluid to move upward between walls 41 and 43 thus removing light solids from the zone of communication.

Figure 3:
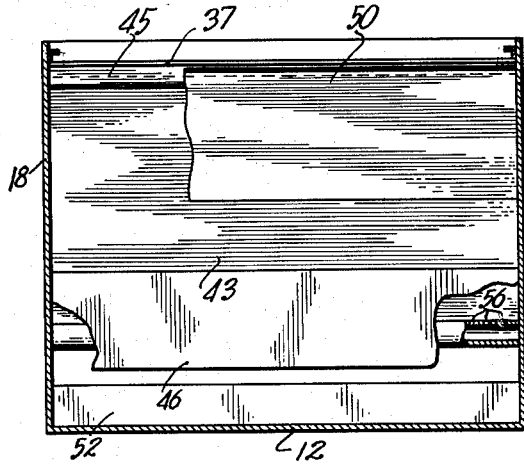
FIG. 3 is a sectional elevation taken along lines 3—3 of FIG. 2 and having portions broken away to show details of the structure.

The structure of FIGS. 1, 2 and 3 may be provided with a guide flange 52 located at the intersection of wall 20 and bottom 12 and extending across from side 16 to side 18, the purpose of flange 52 being to guide fluid taken out of the aeration tank 42 into settling chamber 40 and mouth 48 as previously described.

The embodiment of the invention illustrated in FIGS. 2 and 3 is identical in all respects to that shown in FIG. 1, and hereinabove described, except that in the form shown in FIGS. 2 and 3 an air inlet conduit 54 is provided entering the tank 10 through side wall 16 and extending thereacross to sidewall 18 within the boundaries of mouth 48. Conduit 54 is supplied with a plurality of air distributing orifices 56 for the purpose of releasing air bubbles across the width of tank 10 within the mouth 48, the same rising up through the passage defined by walls 41 and 43 and enhancing the upward flow therethrough.

It is to be understood that the various air supply conduits 54 and 30 described in the specification may be connected to a common source of air.

Having thus described the invention what is claimed as new and desired to be secured by Letters Patent is:

1. In a plant for the treatment of liquid carried sewage material, a treatment tank comprising: a bottom having end walls and side walls extending upwardly therefrom, partition means extending between said side walls to divide said tank into an aeration chamber and a settling chamber, means for introducing sewage bearing liquid into said aeration chamber adjacent the upper edge of one of said end walls, means adjacent said introducing means for directing introduced sewage bearing liquid downwardly along said one end wall, air releasing means in said tank adjacent said one end wall, means adjacent said one end wall for turning the downward flow of sewage bearing liquid outwardly away from said one end wall over said air releasing means, rising air from said air releasing means turning the flow of introduced sewage bearing liquid upwardly toward the surface of the liquid in said tank and toward the other end wall thereof, outlet means in said settling chamber formed at a predetermined level in at least one of said walls for limiting the surface level of sewage bearing liquid in said tank, substantially all of the sewage bearing liquid flowing toward the surface of the liquid in said tank and toward the other end wall being directed downwardly toward the bottom of said tank by said partition means, said partition means including a first partition wall having its lower extremity in spaced relationship from said bottom and its upper extremity extending above the level of liquid in said tank, a second partition wall having its lower extremity in spaced relation to said bottom and its upper extremity terminating below the level of liquid in said tank and spaced from said first partition wall on the aeration chamber side of said first partition wall, and a third partition wall having its upper extremity terminating above the level of liquid in said tank and spaced from said second partition wall on the aeration chamber side of said second partition wall, said third partition wall blocking the stream of sewage bearing liquid flowing toward said settling chamber and directing said stream downwardly along said partition means, a first portion of said downwardly directed sewage bearing liquid flowing under said partition means into said settling chamber, a second portion of said downwardly directed sewage bearing liquid flowing upwardly between said first and second partition walls and then downwardly between said second and third partition walls into said aeration chamber once more, and a third portion of said downwardly directed sewage bearing liquid flowing back toward said one end wall along said tank bottom to define a rotational flow of sewage bearing liquid in said aeration chamber, said third partition wall being shorter than said second partition wall and said partition walls being spaced a predetermined relatively short distance from each other, whereby the flow of said downwardly directed sewage bearing liquid past the lower end of said third partition wall is effective to create a reduction in pressure between said second and third partition walls and induce the flow of said second portion of sewage bearing liquid upwardly between said first and second partition walls and then downwardly between said second and third partition walls.

2. The treatment tank of claim 1 further characterized by and including air releasing means in said tank at the lower extremities of said first and second partition walls for releasing bubbles of air upwardly between said first and second partition walls and enhancing the flow of sewage bearing liquid upwardly therebetween.

References Cited in the file of this patent
UNITED STATES PATENTS 2,246,224    Streander _____ June 17, 1941
2,574,685    Baxter et al. _____ Nov. 13, 1951